Patented Mar. 28, 1950

2,502,197

UNITED STATES PATENT OFFICE 2,502,197

METHOD OF STERILIZING CORN PRODUCTS

Charles Olin Ball, Maumee, Ohio, assignor to The United Products Company, Westminster, Md., a corporation of Maryland No Drawing. Application January 14, 1949, Serial No. 71,026

20 Claims. (Cl. 99—186)

This invention relates to corn products and more particularly to processes for sterilizing canned corn products.

An object of this invention is to produce canned corn products which are free from active spoilage bacteria and the color, flavor and texture of which are not impaired by prolonged periods of sterilization.

Another object of this invention is to sterilize efficiently and economically canned corn products and more particularly canned corn products containing a kernel component and a finely divided corn grain component.

Another object of this invention is to sterilize canned corn products containing a corn kernel component and a finely divided corn grain component in a markedly shorter period than that obtained by currently used practices.

In the processing of canned corn products containing a corn kernel component and a finely divided corn grain component such as canned cream style corn, it is essential that the contents of the can be thoroughly sterilized after sealing to ensure the destruction of spoilage bacteria. By currently used processes, however, the time required at elevated temperatures for the sterilization of canned corn products of commercial size such as the No. 2 or No. 10 can, is of such relatively long duration that serious impairment of the flavor, color and nutritive values of the product frequently results. Because of the impairment of the characteristics of the cream style corn, it has been the practice in the commercial packing of cream style corn to establish the time and temperature of sterilization at the lowest values which give reasonable protection against bacterial spoilage. But even though the time and temperature be carefully determined, some impairment of the color, flavor and nutritive value results because of the relatively long time required. Any substantial deviation from the established limits of time and temperature results either in serious impairment of the color, flavor and nutritive value of the product, if the time be too long or the temperature too high, or in spoilage of the product from bacteria if the time be too short or the temperature too low to effect their destruction.

In accordance with this invention, canned cream style corn is produced which is adequately sterilized and the color, flavor and nutritive value of which is not impaired as when currently used processes are employed for the sterilization. Moreover, the time required for sterilization of the canned cream style corn by the practice of this invention is about ⅔ as long as that necessary to kill spoilage bacteria by currently used processes and, because of this saving in time, it becomes practicable to process the canned cream style corn products in a continuous cooker as well as in the batch cooker such as is now used.

The corn product which is adapted to be sterilized in accordance with the process of this invention comprises 30 to 65%, and preferably 45 to 60% by weight, of corn kernels which may be whole kernels or parts of whole kernels and the remainder a sauce containing from 8 to 90%, and preferably from 35 to 60% by weight, of finely divided corn grains in added water. The added water may, and usually does, contain sufficient salt and sugar to improve the taste of the resulting product. The added water may also contain other ingredients such as minerals or water soluble vitamins. The term, "added water," in the claims therefor means added water which may or may not contain ingredients such as sugar, salt, minerals or water soluble vitamins. Desirably, the corn kernels are whole kernels or alternatively of a size greater than ⅓ of whole kernels or alternatively whole kernels divided into not more than three parts or alternatively mixtures thereof. A corn kernel component found satisfactory comprises a mixture of whole kernels, kernel sections of a size essentially greater than ⅓ of whole kernels and fragments of kernels, in which less than 10% and preferably less than 2% by weight of such mixture is capable of passing through an 8-mesh sieve. Desirably, 50 to 100%, and preferably 80 to 100%, of the finely divided corn grains before being mixed with added water are capable of passing through an 8-mesh sieve. The corn used in preparing this product may be free of corn silks, cob tissues and worms and produced in accordance with the methods disclosed in the copending applications of Ralph Cover, entitled "Cream style corn" and "Corn products."

In the process of this invention, the kernel component, the finely divided corn grains and the added aqueous liquid are placed in a container in such a manner and sterilized under such conditions that, during sterilization, the added water is mixed with not more than 35%, and preferably not more than 25%, of its own weight of the finely divided corn grains, while the corn kernels and the remainder of the finely divided corn grains which is not contained in the added water are substantially stratified in layers. It is essential that during the sterilization the stratified layers of the corn kernels and the finely divided corn grains be maintained and that there be no substantial mixing of the strata during sterilization. After the sterilization, the corn kernels and the finely divided corn grains may, if desired, be thoroughly mixed to ensure a uniform distribution of the corn kernels and finely divided corn grains throughout the can. The "added water" may not contain any finely divided corn grains. Accordingly, the expressions in the claims of the added water which contains not more than 35%, or not more than 25%, of its weight of finely divided corn grains embrace within their purview added water which may or may not contain any finely divided corn grains, the only limitation in the claims being that if the added water does contain finely divided corn grains, the added water does not contain more than 25% or 35% of its weight of the finely divided corn grains, as specifically denoted in the claims. Also, when during sterilization the "added water" contains no, or substantially no, finely divided corn grains, the term "remainder of said finely divided corn grains" in the claims means in such situations all, or substantially all, of the finely divided corn grains in the final corn product. The term in the claims relating to the remainder of the finely divided corn grains covers situations where, during sterilization, the added water may or may not contain such finely divided corn grains.

In the practice of this invention, any method of filling the cans with the food product prior to sterilization may be used which effects the stratification of the finely divided corn grains and the corn kernels and which ensures that the added water is mixed with not more than 35%, and preferably not more than 25%, of its weight of the finely divided corn grains. When during sterilization the finely divided corn grains and the corn kernels are so arranged, the heat penetrates among and through the corn kernels of the product rapidly since the interstices of the corn kernels are filled either with the added water or with steam. Since the corn kernels constitute from 30 to 65%, and preferably 45 to 60% such as about 50%, of the total weight of corn product in the container, since the layer or layers of concentrated finely divided corn grains of the product are located between the corn kernels and the wall or end of the container, and since the temperature rises rapidly within the mass of corn kernels, the temperature also rises rapidly at all faces of the comparatively thin layers or layers of concentrated finely divided corn grains. The layer or layers of finely divided corn grains constitute the only segregated portions of the product through which convection currents do not operate to carry heat into the product. Since these layers are comparatively thin, heat penetrates through them by conduction in a comparatively short time. In the process of sterilization in accordance with this invention, the rate of flow of heat is affected very little, if at all, by wide variation in moisture content of the finely divided product. For example, heat flows through a finely comminuted succulent food product to which no aqueous liquid has been added at practically the same rate as it flows after the volume of the finely divided component of that product is doubled by mixing with water. Through delay of the mixing of the added water with the concentrated finely divided corn grains and through delay of dispersion of the finely divided corn grains into the interstices of the corn kernels until after sterilization has been completed, it is possible to sterilize a corn product in approximately 60% of the time that would be required if the sauce comprising the finely divided corn grains and added water were mixed prior to sterilization. A measure of the magnitude of the difference in heat penetration effected by the practice of the processes of this invention over currently used processes is illustrated by reference to the recommendations of the National Canners' Association for the processing of cream style corn by currently used processes of sterilization. The National Canners' Association recommend a period of sterilization at 240° F. of 90 minutes for a No. 2 can and 180 minutes for the No. 10 can. Similar effective sterilization by the processes of this invention is produced at 240° F. in 60 minutes for the No. 2 can and 115 minutes for a No. 10 can. In fact, it has been found that where the same initial temperature and same processing temperature are employed in the sterilization of cream style corn in 303 cans, a period of 42 minutes of sterilization in accordance with this invention is equivalent in sterilizing value to a period of 67 minutes by currently used processes.

One satisfactory method for filling the cans by the practice of this invention is to pour into the can the corn kernels and added water to form a layer after which the finely divided corn grains are poured into the can to form a layer on top of the corn kernels. In this manner, the finely divided corn grains and the corn kernels containing the added water form two layers or strata and the added water is mixed with not more than 35%, and preferably not more than 25%, of its own weight of the finely divided corn grains. The can may then be sealed in a conventional manner, such as by subjection to a vacuum greater than ½ atmosphere and hermetically sealing the can. Regardless of the manner of sealing, however, it is essential that there is no disturbance of the strata of the finely divided corn grains and corn kernels during that step in the process. The contents of the can is then sterilized, and during sterilization it is also essential that there be no substantial mixing of the two layers. After the sterilization has been completed, the corn product may be agitated, if desired, to ensure the uniform distribution of each of the components throughout the can.

Another method of filling the can prior to sterilization is to place a layer of the finely divided corn grains in a container followed by a layer of the corn kernels with the added water. The container may then be sealed and sterilized while maintaining the strata in the position in which the components are poured in the container or the container, after sealing, may be rotated approximately 180° and the canned corn product sterilized so that the finely divided corn grains constitutes the top layer during the sterilization and the added water occupies the interstices between the corn kernels. This latter procedure is more desirable since the finely divided corn grains, if allowed to remain in the bottom of the container during the process frequently becomes packed in the bottom of the container, particularly if the period between the filling of the can and the sterilization is prolonged. As a result of this packing of the finely divided corn grains, the finely divided corn grains do not mix readily with the corn kernels upon shaking after sterilization. If desired, after the can has been rotated approximately 180° so that the finely divided corn grains are in the upper portion of the can, the can and its contents may be held before sterilization for a period up to five hours within a medium maintained at a temperature between 50° and 160° F. without causing any reduction in the rate of heating of the product during the sterilizing process. Certain corn products, particularly when the starch content of the liquid is relatively low, may be heated to higher temperatures, such as 180° or 200° F., without any substantial impairment in the rate of heating during the subsequent sterilizing process.

Another method of filling the container is to place a layer of corn grains in the can followed by a layer of corn kernels with the added water and finally followed by a layer of the finely divided corn grains. The can is then sealed and the contents sterilized under conditions so that there is no appreciable intermixing of the three layers. In addition, it is of course also essential that the added water is mixed with not more than 35%, and preferably not more than 25%, of its own weight of the finely divided component.

The sterilization may be effected with the can or container in any position as long as the strata of finely divided corn grains and corn kernels with the added water are maintained. For example, the sterilization may be conducted by applying a fluid medium, such as steam, to the outsides of the cans when the cans are positioned so that the longitudinal axis of the container is in a substantially vertical position during the sterilization or, again, the longitudinal axis of the container may be maintained in a substantially horizontal position during the sterilization. Any method of heating may be used which raises the temperature of the contents of the can sufficiently high to destroy or render ineffective the spoilage bacteria contained within the can. One method which is particularly effective is the conventional process of subjecting the outside of the cans to a heated fluid medium. The temperature of the fluid medium, such as steam, employed for the sterilization may be within the usual conventional range of temperatures employed for this purpose, such as between 240 and 260° F.

While the temperatures of the finely divided corn grains, corn kernels and the added water at the time they are placed in the container may be at that of the room (e. g. 50 to 70° F.), it may be advantageous in some cases to mix the added water with a portion of the finely divided corn grains, not exceeding 35%, and preferably not exceeding 25%, of the weight of the added water before mixing, heating the mixture of added water with the portion of finely divided corn grains in it to a temperature which, in case the mixture of water and finely divided corn grains contains more than 2 percent of starch, is not higher than 180° F., partially filling the container with the mixture, then adding the corn kernels and the remainder of the finely divided corn grains which are unmixed with the added water in such a manner that the corn kernels and the remainder of the finely divided corn grains which are unmixed with the added water form two adjacent, unmixed, separate layers and the added water is contained in the interstices of the corn kernels. Another modification which may be practiced in the filling of the container prior to sterilization is to fill separately the finely divided corn grains and the corn kernels, both of which are unheated, and then fill the added water at a temperature of 50 to 212° F. so that stratified layers of the corn kernels and the finely divided corn grains are formed and the finely divided corn grains are substantially unmixed with the corn kernels and the added water. The container is then sealed and sterilized as heretofore described.

With respect to the heating of the components prior to their introduction into the containers, it may be stated that the corn kernels and finely divided corn grains may or may not be heated to a temperature between 105° F. and the boiling temperature at atmospheric pressure.

As previously discussed, it is desirable that at least 90%, and preferably at least 98% by weight of the kernel component be capable of being retained on an 8-mesh sieve, while desirably 50 to 100%, and preferably 80 to 100% by weight, of the finely divided corn grains before being mixed with the added water be capable of passing through an 8-mesh sieve. It is also advantageous that 50% by weight of the kernel component be capable of being retained on a 4-mesh sieve, that substantially none of the kernel component be capable of passing through a 14-mesh sieve, that substantially all the finely divided corn grains be capable of passing through a 4-mesh sieve and that a minimum of 25% by weight of the finely divided corn grains before being mixed with the added water be capable of passing through a 14-mesh sieve.

If the canned corn product be considered from the standpoint of the finished product rather than from the standpoint of the components which are added to make up that product, it is desirable that the resulting corn product contain at least 3.5% by weight of an added water, that 25 to 80%, and preferably 45 to 65% by weight, of the resulting composite product be a coarse component which is capable of being retained on an 8-mesh sieve, and that 20 to 75%, and preferably 35 to 55% by weight, be a fine component which is capable of passing through an 8-mesh sieve. But whether the canned corn product be considered from the standpoint of the ingredients which are employed to prepare it or from the standpoint of the finished product, it is essential that during sterilization the added water contain not more than 35%, and preferably not more than 25% of its own weight before mixing, of the fine component or the finely divided corn grains and that the remainder of the fine component or finely divided corn grains and the coarse component or corn kernels be substantially stratified in layers.

When there is appreciable starch in the corn product, it is essential that the sterilization be effected under such conditions that the added water is mixed with not more than 4% of its own weight of starch derived from both the finely divided corn grains and the corn kernels. Otherwise, heat penetration during sterilization will be markedly retarded.

A more comprehensive understanding of this invention is obtained by reference to the following example:

The corn product of this example is made from succulent sweet corn kernels and a brine consisting of water, sugar, and salt.

The ears of corn are husked either mechanically or by hand and the kernels are cut from the cob in the manner followed by packers of whole kernel corn. The kernels are cut from the cob near the kernel tip so that the cut kernels are essentially whole. They are silked, screened, and thoroughly washed and inspected to ensure the absence of silks, husks, cob tissues and other foreign substances. They are sorted according to tenderness or maturity and the tenderest kernels are selected to serve as the whole kernel component of the product. The remaining kernels are treated mechanically to reduce them to a product of creamy consistency sufficiently fine so that at least 75% by weight of the product to be used as the corn grain component is capable of passing through an 8-mesh sieve. The resulting corn grains contain in finely comminuted form all of the constituents of the kernels.

The composition of the brine may be varied according to the characteristics of the corn to be used, but a typical brine is made by dissolving 11 pounds, 10 ounces of sugar and 2 pounds, 8 ounces of salt in 10 gallons of water.

For a product in #2 cans containing approximately 50% of whole kernels and a sauce which is composed of approximately 55% of concentrated corn cream and 45% of brine, a typical procedure for filling, closing, and processing the cans is as follows: Into each can is first placed 5.7 ounces of concentrated cream, then 10.3 ounces of whole kernels, then 4.7 ounces of brine. As soon as filled, the cans are sealed under a vacuum equivalent to 20 inches of mercury and each can is immediately inverted so that the layer of concentrated cream is on top of the whole kernels, which are mixed with brine. When the ingredients are filled at a temperature of 70° F., the cans, while being retained in the inverted position, are sterilized in a process of 55 minutes at 250° F. After sterilization, the can may be agitated to ensure a uniform distribution of all components throughout the product.

The terms and expressions which I have employed are used as terms of description and not of limitation, and I have no intention, in the use of such terms and expressions, of excluding any equivalents of the features shown and described or portions thereof, but recognize that various modifications are possible within the scope of the invention claimed.

What is claimed is:

1. The process of sterilizing a corn product containing 30 to 65% of corn kernels selected from the class consisting of whole corn kernels and parts of whole corn kernels and the remainder a sauce containing 8 to 90% of finely divided corn grains in added water, said process comprising sterilizing said product in a container while said added water contains not more than 35% of its weight of said finely divided corn grains, and while said corn kernels and the remainder of said finely divided corn grains are substantially stratified in layers.

2. The process of sterilizing a corn product containing 30 to 65% of corn kernels selected from the class consisting of whole corn kernels and parts of whole corn kernels and the remainder a sauce containing 8 to 90% of finely divided corn grains in added water, said process comprising sterilizing said corn product in a container while said added water contains not more than 35% of its weight of said finely divided corn grains and not more than 4% of its weight of starch derived from said finely divided corn grains and from said corn kernels and while said corn kernels and said finely divided corn grains are substantially stratified in layers.

3. The process of sterilizing a corn product containing 30 to 65% of corn kernels selected from the class consisting of whole corn kernels and parts of whole corn kernels, at least 90% of which are capable of being retained on an 8-mesh sieve, and the remainder a sauce containing 8 to 90% of finely divided corn grains in added water, 50 to 100% of said finely divided corn grains, before being mixed with water, being capable of passing through an 8-mesh sieve, said process comprising sterilizing said product in a container while said added water contains not more than 35% of its weight of said finely divided corn grains and while the remainder of said finely divided corn grains and said corn kernels mixed with said added water are substantially stratified in layers in said container.

4. The process of sterilizing a corn product containing 45 to 60% of corn kernels selected from the class consisting of whole corn kernels and parts of whole corn kernels, at least 98% of which are capable of being retained on an 8-mesh sieve, and the remainder a sauce containing 35 to 60% of finely divided corn grains in added water, 80 to 100% of said finely divided corn grains, before being mixed with water, being capable of passing through an 8-mesh sieve, said process comprising sterilizing said product in a container while said added water contains not more than 25% of its weight of said finely divided corn grains and while the remainder of said finely divided corn grains and said corn kernels mixed with said added water are substantially stratified in layers in said container.

5. The process of sterilizing a corn product containing 45 to 60% of corn kernels selected from the class consisting of whole corn kernels and parts of whole corn kernels, at least 98% of which are capable of being retained on an 8-mesh sieve, and the remainder a sauce containing about 50% of finely divided corn grains in added water, 80 to 100% of said finely divided corn grains, before being mixed with water, being capable of passing through an 8-mesh sieve, said process comprising sterilizing said product in a container while said added water contains not more than 25% of its weight of said finely divided corn grains and while the remainder of said finely divided corn grains and said corn kernels mixed with said added water are substantially stratified in layers.

6. The process of sterilizing a corn product containing 30 to 65% of corn kernels selected from the class consisting of whole corn kernels and parts of whole corn kernels and the remainder a sauce containing 8 to 90% of finely divided corn grains in added water, said process comprising adding to a container said corn kernels, said added water containing not more than 35% of its weight of said finely divided corn grains and the remainder of said finely divided corn grains, hermetically sealing said container and sterilizing the container and the contents thereof while maintaining said corn kernels and said remainder of said finely divided corn grains in strata.

7. The process of sterilizing a corn product containing 45 to 60% of corn kernels selected from the class consisting of whole corn kernels and parts of whole corn kernels, at least 98% of which are capable of being retained on an 8-mesh sieve, and the remainder a sauce containing 35 to 60% of finely divided corn grains in added water, 80 to 100% of said finely divided corn grains, before being mixed with water, being capable of passing through an 8-mesh sieve, said process comprising adding to a container said corn kernels, said added water containing not more than 25% of its weight of said finely divided corn grains and the remainder of said finely divided corn grains, hermetically sealing said container and sterilizing the container and the contents thereof while maintaining said corn kernels and said remainder of said finely divided corn grains in strata.

8. The process of sterilizing a corn product containing 45 to 60% of corn kernels selected from the class consisting of whole corn kernels and parts of whole corn kernels, at least 98% of which are capable of being retained on an 8-mesh sieve, and the remainder a sauce containing about 50% of finely divided corn grains in added water, 80 to 100% of said finely divided corn grains, before being mixed with water, being capable of passing through an 8-mesh sieve, said process comprising adding to a container said corn kernels, said added water containing not more than 25% of its weight of said finely divided corn grains and the remainder of said finely divided corn grains, hermetically sealing said container and sterilizing the container and the contents thereof while maintaining said corn kernels and said remainder of said finely divided corn grains in strata.

9. The process of sterilizing a corn product containing 30 to 65% of corn kernels selected from the class consisting of whole corn kernels and parts of whole corn kernels, at least 90% of which are capable of being retained on an 8-mesh sieve, and the remainder a sauce containing 8 to 90% of finely divided corn grains in added water, 50 to 100% of said finely divided corn grains before being mixed with water being capable of passing through an 8-mesh sieve, said process comprising adding successively to a container a portion of said finely divided corn grains, said corn kernels, said added water and the remaining portion of said finely divided corn grains, hermetically sealing said container, sterilizing said container and the contents thereof while said corn kernels and said finely divided corn grains are substantially stratified in layers and while said added water contains not more than 35% of its weight of corn grains and, after sterilization, agitating the container to ensure a uniform distribution of said corn kernels and said finely divided corn grains throughout the product.

10. The process of sterilizing a corn product containing 45 to 60% of corn kernels selected from the class consisting of whole corn kernels and parts of whole corn kernels, at least 98% of which are capable of being retained on an 8-mesh sieve, and the remainder a sauce containing 35 to 60% of finely divided corn grains in added water, 80 to 100% of said finely divided corn grains before being mixed with water being capable of passing through an 8-mesh sieve, said process comprising adding successively to a container a portion of said finely divided corn grains, said corn kernels, said added water and the remaining portion of said finely divided corn grains, hermetically sealing said container, sterilizing said container and the contents thereof while said corn kernels and said finely divided corn grains are substantially stratified in layers and while said added water contains not more than 25% of its weight of said finely divided corn grains and, after sterilization, agitating the container to ensure a uniform distribution of said corn kernels and said finely divided corn grains throughout the product.

11. The process of sterilizing a corn product containing 30 to 65% of corn kernels selected from the class consisting of whole corn kernels and parts of whole corn kernels and the remainder a sauce containing 8 to 90% of finely divided corn grains in added water, said process comprising successively adding said finely divided corn grains, said corn kernels and said added water containing not more than 35% of its weight of said finely divided corn grains to a container, hermetically sealing the container without disturbing substantially the strata of said finely divided corn grains and said corn kernels, inverting the container approximately 180° so that the finely divided corn grains stratum is in the upper portion of said container and said added water occupies the interstices between the corn kernels and sterilizing the container and contents thereof while said added water contains not more than 35% of its weight of said finely divided corn grains and while maintaining substantially the strata of said corn kernels and said finely divided corn grains.

12. The process of sterilizing a corn product containing 45 to 60% of corn kernels selected from the class consisting of whole corn kernels and parts of whole corn kernels, at least 98% of which are capable of being retained on an 8-mesh sieve, and the remainder a sauce containing 35 to 60% of finely divided corn grains in added water, 80 to 100% of said finely divided corn grains, before being mixed with water, being capable of passing through an 8-mesh sieve, said process comprising successively adding said finely divided corn grains, said corn kernels and said added water containing not more than 35% of its weight of said finely divided corn grains to a container, hermetically sealing the container without disturbing substantially the strata of said finely divided corn grains and said corn kernels and sterilizing the container and contents thereof while said added water contains not more than 35% of its weight of said finely divided corn grains and while maintaining substantially the strata of said corn kernels and said finely divided corn grains.

13. The process of sterilizing a corn product containing 30 to 65% of corn kernels selected from the class consisting of whole corn kernels and parts of whole corn kernels and the remainder a sauce containing 8 to 90% of finely divided corn grains in added water, said process comprising adding said corn kernels and said finely divided corn grains to a container to effect a stratification in the container of one layer of said corn kernels between two layers of said finely divided corn grains, sealing the container and sterilizing the container and its contents while said added water contains not more than 35% of its weight of said finely divided corn grains and while maintaining substantially the strata of said corn kernels and said finely divided corn grains, said container during sterilization being so positioned that the longitudinal axis of the container is in a substantially horizontal position.

14. The process of sterilizing a corn product containing 45 to 60% of corn kernels selected from the class consisting of whole corn kernels and parts of whole corn kernels and the remainder a sauce containing 35 to 60% of finely divided corn grains in added water, said process comprising mixing said added water with a portion of said finely divided corn grains, not exceeding 25% of the weight of said added water, filling a container with the resulting mixture, said corn kernels and the remainder of said finely divided corn grains which is unmixed with the added water so that said corn kernels and said remainder of said finely divided corn grains form separate strata and are substantially unmixed with each other, hermetically sealing the container and sterilizing the container and its contents while maintaining substantially the strata of said corn kernels and said remainder of said finely divided corn grains.

15. The process of sterilizing a corn product containing 45 to 60% of corn kernels selected from the class consisting of whole corn kernels and parts of whole corn kernels, at least 98% of which are capable of being retained on an 8-mesh sieve, and the remainder a sauce containing 35 to 60% of finely divided corn grains in added water, 80 to 100% of said finely divided corn grains before being mixed with water being capable of passing through an 8-mesh sieve, said process comprising mixing the added water with a portion of said finely divided corn grains, not exceeding 25% of the weight of said added water, filling a container with said corn kernels, said added water in the interstices among said corn kernels and the remainder of said finely divided corn grains which is unmixed with the added water so that said corn kernels and said remainder of said finely divided corn grains which is unmixed with water form separate strata and are substantially unmixed with each other, hermetically sealing the container and sterilizing the container and its contents while maintaining substantially the strata of said corn kernels and said remainder of said finely divided corn grains.

16. The process of sterilizing a corn product containing 30 to 65% of corn kernels selected from the class consisting of whole corn kernels and parts of whole corn kernels and the remainder a sauce containing 8 to 90% of finely divided corn grains in added water, said process comprising mixing with the added water a portion of said finely divided corn grains, not exceeding 35% of the weight of said added water, heating the mixture of added water and said finely divided corn grains to a temperature not higher than 180° F., filling the container with said mixture, said corn kernels and the remainder of said finely divided corn grains which is unmixed with the added water so that said corn kernels and said remainder of said finely divided corn grains which is unmixed with added water form separate strata and are substantially unmixed with each other while said added water is in the interstices of said corn kernels, hermetically sealing the container and sterilizing the container and its contents while maintaining substantially the strata of said corn kernels and said remainder of said finely divided corn grains.

17. The process of sterilizing a corn product containing 30 to 65% of corn kernels selected from the class consisting of whole corn kernels and parts of whole corn kernels and the remainder a sauce containing 8 to 90% of finely divided corn grains in added water, said process comprising adding separately said finely divided corn grains, said corn kernels, both of which are unheated, and said added water at a temperature of 50° to 212° F. so that stratified layers of said corn kernels and said finely divided corn grains are formed, and said finely divided corn grains are substantially unmixed with said corn kernels and said added water, sealing said container and sterilizing said container and the contents thereof while said added water contains not more than 35% of its weight of said finely divided corn grains and while maintaining said finely divided corn grains and said corn kernels in strata.

18. The process of sterilizing a corn product containing 30 to 65% of corn kernels selected from the class consisting of whole corn kernels and parts of whole corn kernels, at least 90% of which are capable of being retained on an 8-mesh sieve, and the remainder a sauce containing 8 to 90% of finely divided corn grains in added water, 50 to 100% of said finely divided corn grains before being mixed with water being capable of passing through an 8-mesh sieve, said process comprising adding separately said finely divided corn grains, said corn kernels, both of which are maintained at a temperature of 50° to 212° F., and said added water at a temperature of 50° to 212° F. so that stratified layers of said corn kernels and said finely divided corn grains are formed, and said finely divided corn grains are substantially unmixed with said corn kernels and said added water, sealing said container and sterilizing said container and the contents thereof while said added water contains not more than 35% of its weight of said finely divided corn grains and while maintaining said finely divided corn grains and said corn kernels in strata.

19. The process of sterilizing a corn product containing 30 to 65% of corn kernels selected from the class consisting of whole corn kernels and parts of whole corn kernels and the remainder a sauce containing 8 to 90% of finely divided corn grains in added water, said process comprising adding said corn kernels and said finely divided corn grains to a container to effect a stratification in the container of one layer of said corn kernels between two layers of said finely divided corn grains, sealing the container and sterilizing the container and its contents while said added water contains not more than 35% of its weight of said finely divided corn grains and while maintaining substantially the strata of said corn kernels and said finely divided corn grains.

20. The process of sterilizing a corn product containing 30 to 65% of corn kernels selected from the class consisting of whole corn kernels and parts of whole corn kernels and the remainder a sauce containing 8 to 90% of finely divided corn grains in added water, said process comprising sterilizing said corn product in a container while said added water contains not more than 35% of its weight of said finely divided corn grains, while said corn kernels and said finely divided corn grains are substantially stratified in layers and while said stratified layers extend longitudinally in said container.

C. OLIN BALL.

REFERENCES CITED

The following references are of record in the file of this patent:

UNITED STATES PATENTS

| Number | Name | Date |
|---|---|---|
| 1,940,773 | Sells | Dec. 26, 1933 |
| 2,217,698 | Musher | Oct. 15, 1940 |
| 2,232,282 | Struble | Feb. 18, 1941 |